(12) United States Patent
Lutkus et al.

(10) Patent No.: US 6,224,311 B1
(45) Date of Patent: May 1, 2001

(54) COATED FASTENER INSERTS AND METHOD OF PRODUCING THE SAME

(75) Inventors: William J. Lutkus, Watertown; William Giannakakos, Danbury, both of CT (US)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/356,988

(22) Filed: Jul. 20, 1999

(51) Int. Cl.[7] ................................................ F16B 37/12
(52) U.S. Cl. ............................ 411/178; 411/438; 411/903
(58) Field of Search ................................ 411/178, 438, 411/436, 902, 903

(56) References Cited

U.S. PATENT DOCUMENTS

| 3,602,975 | 9/1971 | Thurston et al. . |
|---|---|---|
| 4,553,302 | 11/1985 | Cosenza et al. . |
| 4,645,398 | 2/1987 | Cosenza et al. . |
| 4,811,618 | * 3/1989 | Takayama ........................ 411/438 X |
| 5,131,795 | 7/1992 | Kobusch . |
| 5,611,652 | * 3/1997 | Duffy et al. ..................... 411/903 X |

* cited by examiner

Primary Examiner—Neill Wilson
(74) Attorney, Agent, or Firm—Harness, Dickey & Pierce, P.L.C.

(57) ABSTRACT

Disclosed is a method for preventing galvanic corrosion in fastener assemblies by coating fastener inserts with a resin bonded fluoropolymer composition having an average viscosity of between about 20 to 30 seconds at 25° C. Also disclosed is a method for providing coated inserts as well as the coated inserts produced.

14 Claims, 2 Drawing Sheets

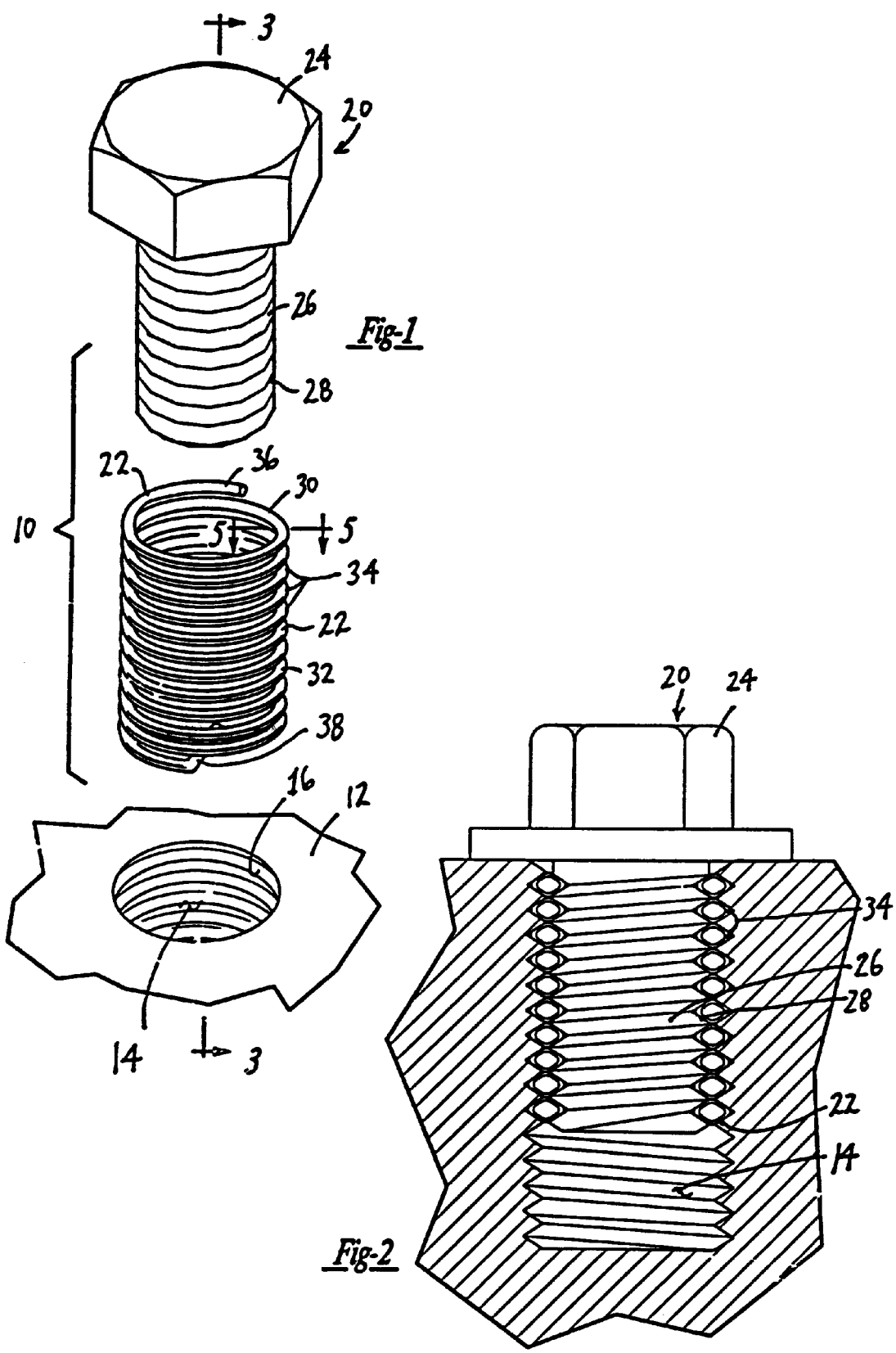

COATED FASTENER INSERTS AND METHOD OF PRODUCING THE SAME

BACKGROUND OF THE INVENTION

The present invention relates to coated fastener inserts and a method for coating such fastener inserts and, more particularly, to coating fastener inserts to prevent the galvanic corrosion in fastener assemblies.

Fastener assemblies come in a variety of shapes, sizes, designs and materials. Many fastener assemblies include not only a fastener such as a bolt, pin or screw, but also will include a fastener insert to be positioned within a tapped hole.

The type of fastener insert needed for a particular fastening operation will in large part dictated the type of fastener to be employed. While the present invention is applicable to various fastener assemblies wherein galvanic corrosion is a potential problem, the invention will hereinafter be described with reference to fastener assemblies with metallic helically coiled wire fastener inserts. By way of non-limiting example, certain metallic helically coiled wire inserts useful in association with a threaded fastener is described in U.S. Pat. No. 2,672,070 entitled Wire Coil Screw Thread Insert for Molded Material. Other fastener inserts which can be coated in accordance with the teachings of the present invention are described in U.S. Pat. Nos. 2,512,316; 2,586,007; 2,708,265; 2,755,699; 2,874,741; 2,934,123; 3,018,684, each of which is expressly incorporated by reference.

Generally speaking, tapped threads are strengthened due to the inherent flexibility of helically coiled wire inserts since the insert provides a more balanced distribution of dynamic and static loads throughout the length of thread engagement. This is especially important when the substrate including tapped holes is formed from a relatively soft metal, i.e., aluminum and magnesium. The inherent flexibility also compensates for variation in lead and angle error.

Additionally, no stress is initially introduced to the substrate because the helically coiled insert does not exhibit staking, locking or swaying and does not require keying in place. Helically coiled wire inserts allow for the use of smaller bosses, flanges and fasteners than other inserts, thus presenting a cost savings, particularly for high volume applications.

While such helically coiled wire inserts are generally useful as anchoring mechanisms for threaded fasteners in order to be used in high strength applications, such inserts must be formed from high strength metals such as 302/304 stainless steel. The use of stainless steel inserts in association with substrates or fasteners formed from other alloys leads to certain perceived problems such as the possibility of galvanic corrosion occurring over time. By the phrase "galvanic corrosion", it is meant the electrochemical corrosion resulting from the current caused in a galvanic cell between two dissimilar metals in an electrolyte because of the difference in potential (emf) of the two metals.

Stainless steel fastener inserts have been coated with zinc chromate in an effort to prevent galvanic corrosion. However, application of the zinc chromate requires strict quantitative controls and is considered labor intensive. The application of too much zinc chromate can restrict movement. Additionally, the installation tools would require frequent cleaning to prevent build up of the zinc chromate on mandrels of the tool which is undesirable. The application of too little zinc chromate leads to certain other problems such as inadequate corrosion protection, for example.

In view of the foregoing, the present invention relates to a method for preventing galvanic corrosion in fastener assemblies employing a metallic fastener insert and a fastener for use in a tapped hole, said method comprising the steps of:

a) providing a fastener and a fastener insert for retaining the fastener within said tapped hole;

b) coating said fastener insert with a fluoropolymer composition; and c) adjoining the fastener and coated fastener insert within said tapped hole.

Optionally, the fastener insert is degreased prior to application of the fluoropolymer composition. Additionally, the fastener insert surface to be coated may be abraded using a conventional technique such as grit blasting to enhance the coating's adhesion, wear resistance and overall durability. If the coated fastener insert is likely to be used in the presence of chemicals or corrosive agents, a primer composition may be employed after degreasing but prior to coating, as will be described in greater detail below.

The present invention also relates to a coated metallic fastener insert for securing a fastener within a tapped hole, said insert comprising:

a substantially cylindrical body of helically wound wire including a plurality of convolutions wherein substantially the entire exterior surface is coated with a resin bonded fluoropolymer.

The present invention further relates to a method of producing a fastener insert which is resistant to galvanic corrosion, said method comprising the steps of:

a) providing a metallic fastener insert; and b) coating the metallic fastener with a fluoropolymer composition to substantially encase the metallic fastener.

As a result of coating the fastener insert, It is a primary object of the present invention to extend the useful life of fastener applications by preventing galvanic corrosion within a fastener assembly.

DETAILED DESCRIPTION OF THE DRAWINGS

FIG. 1 a blown apart perspective view of a fastener assembly including a helically wound insert;

FIG. 2 is an assembly view in cross-section of the fastener assembly of FIG. 1;

Figures 3, 4, 5:
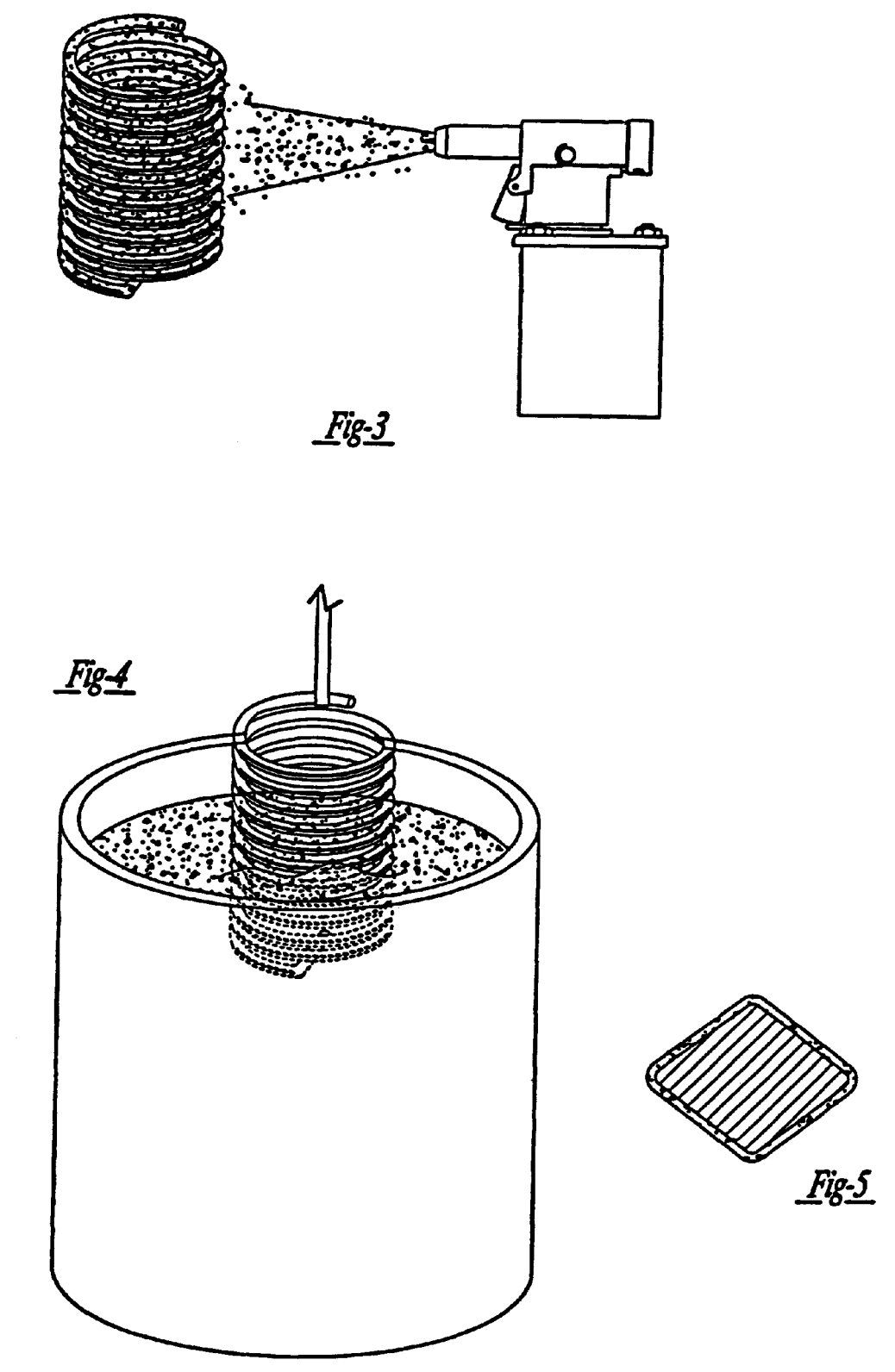

FIG. 3 a perspective view illustrating the spray coating of a helically wound insert;

FIG. 4 is a perspective view illustrating the dip coating of a helically wound insert; and FIG. 5 is a cross-sectional view of a convolution taken along line 5—5 of FIG. 1 of a coated fastener insert.

DETAILED DESCRIPTION OF THE INVENTION

Referring to FIG. 1, there is shown a fastener assembly 10 for use in association with a substrate 12 having one or more tapped holes 14 including inwardly projecting threads 16. The fastener assembly 10 includes a fastener 20 and fastener insert 22 insertable within the tapped hole 14.

The fastener 20 generally includes a head 24 and a shank 26 having radially outwardly projecting threads 28. The fastener insert 22 may be of any form capable of retaining the fastener within a tapped hole but preferably is in the form of a helically wound wire 30 including a body 32 having a plurality of convolutions 34 disposed between first and second ends, 36 and 38, respectively. At least one of the ends may be provided with a driving tang or notch for tangless embodiments for assistance in the installation or removal process.

Preferably, the fastener inserts 22 are larger in diameter, before installation than the tapped holes 14 such that upon installation they become firmly secured within the tapped holes, as shown most clearly in FIG. 2. Further, when the helically wound inserts are disposed within the tapped holes, the coils provide permanent convolution 60° internal screw threads which accommodate virtually any standard threaded bolt or screw.

Prior to inserting the fastener insert 22 within the tapped hole 14, the insert is coated with a resin bonded fluoropolymer composition such as XYLAN® 5251, available from Whitford Corporation of Westchester, Pennsylvania or E/M® 6219, which is available from Engineered Coating Solutions, Inc. of Peachtree City, Ga. by way of non-limiting example. Before applying the fluoropolymer coating, it is preferred that the composition be thoroughly agitated such that the fluoropolymer is adequately dispersed in solution.

As illustrated with reference to FIGS. 3 and 4, the fluoropolymer composition may be applied via dip spin or air spray techniques. In addition to the prevention of galvanic corrosion to which this invention is particularly directed, when the fastener insert is formed from a stainless steel, the fluoropolymer composition may also serve to reduce galling. It is preferred that the dry film thickness be in the range of between 0.03 to about 0.5 mils. As such, it is preferred that under dip spin applications that at least two coats are applied to obtain the preferred thickness. Using conventional spray application techniques, a single coat of between about 0.6 to 1.0 mils. is possible.

Under certain circumstances it may be necessary to modify the viscosity of the fluoropolymer composition by admixing with a solvent such as methylethylketone (mek) until the desired viscosity is obtained. A preferred viscosity is generally in the range of between about 20–30 seconds at 25° C.

As noted above, it is preferred that the fastener inserts be free of contaminants such as oil, grease, metal shavings, etc., since contaminants may cause poor adhesion of the coating to the fastener insert or defects in the dry coating composition. Thus, it is recommended that the fastener inserts be cleaned, i.e., degreased prior to coating using a chlorinated or fluorinated solvent, detergents, or a high temperature burnout process wherein the part is exposed to temperatures roughly between 400 to 425° C. for ten to twenty minutes to ensure that any petroleum based contaminants are fully carbonized.

In addition to cleaning the surface, it is also recommended that the fastener inserts be abraded utilizing conventional techniques such as grit and/or sand blasting. Recommended grit sizes are between about 80 to 120 mesh at an air pressure of about 80 pounds per square inch. Once the abrading step has been carried out, each fastener insert should be solvent rinsed to flush out any grit residue.

Optionally, particularly for applications wherein the fastener assembly is susceptible to harsh environmental conditions, it is preferred that the fastener inserts be pre-treated with a primer which is heat stable calcium or magnesium modified phosphate having a relatively fine crystalline structure. Commercially available compositions which are useful as primers include Aerocoat #3 available from Aerocoat Corporation of Houston, Tex. and Whifford's XYLAN®P-5211 primer or XYLAN® P-5212 primer, particularly wherein the fastener assembly will be subjected to acid rain conditions.

To carry out a dip spin application, each fastener insert is dipped for between about five to ten seconds and subsequently spun for five to fifteen seconds in each direction changing direction at least three times. Thereafter, the fastener insert is cured for between about 7 to 10 minutes at temperatures of between about 190° C. to about 240° C. The part is preferably allowed to cool to ambient temperatures of less than about 38° C. prior to carrying out the aforementioned dip spinning steps to apply the second coat.

Air spray techniques generally involve application at line pressures of between 40 to 50 psi and pop pressures in the range of between 3 to 7 psi at ambient temperatures of less than about 38° C. Following the application of the fluoropolymer composition, the fastener inserts are cured for between about 7 to 10 minutes at temperatures of between about 180° C. to about 240° C.

Upon fully curing the coating upon the fastener inserts quality control in the form of a visual inspection should be carried out. If bridging of the coating between adjacent coils is present, such coils should be rejected.

While it will be apparent that the preferred embodiments of the invention disclosed are well calculated to fulfill the objects stated, it will be appreciated that the invention is susceptible to modification, variation and change without departing from the spirit thereof.

What is claimed is:

1. A coated metallic fastener insert for securing a fastener within a tapped hole of a substrate, at least one of said fastener and said substrate being formed from a metal alloy which differs from the metal of said metallic fastener, said insert comprising:
a substantially cylindrical body of helically wound wire including a plurality of convolutions wherein the outer surface is coated with a fluoropolymer composition to reduce the potential occurrence of galvanic corrosion.

2. The coated metallic fastener insert of claim 1 wherein said coating has an average dry thickness of between about 0.03 to 0.5 mils.

3. The coated metallic fastener insert of claim 1 wherein said coating has an average viscosity at the time of application of between about 20 to 30 seconds at 25° C.

4. The coated metallic fastener insert of claim 1 wherein said insert is formed from stainless steel.

5. The coated metallic fastener insert of claim 1 wherein said insert reduces galling of said fastener.

6. The coated metallic fastener insert of claim 1 further comprising a primer applied to said insert prior to the application of said fluoropolymer composition.

7. The coated metallic fastener insert of claim 1 wherein said coils of said insert provide 60° internal screw threads upon insertion within said tapped hole.

8. The coated metallic fastener insert of claim 6 wherein said coating has an average dry thickness of between about 0.03 to 0.5 mils.

9. The coated metallic fastener insert of claim 6 wherein said coating has an average viscosity at the time of application of between about 20 to 30 seconds at 25° C.

10. A coated metallic fastener insert of a fastener assembly including metallic fastener and a metallic substrate including a taped hole for receiving said fastener and insert, at least one of said insert, fastener and substrate being formed from a metal alloy which is different from the metal of the other of said insert, fastener or substrate, said insert comprising:

a substantially cylindrical body of helically wound wire including a plurality of convolutions wherein the outer surface is coated with a fluoropolymer composition to preclude galvanic corrosion within said fastener assembly.

11. The coated metallic fastener insert of claim 10 wherein said insert is formed from stainless steel.

12. The coated metallic fastener insert of claim 10 wherein said insert reduces galling of said fastener.

13. The coated metallic fastener insert of claim 10 further comprising a primer applied to said insert prior to the application of said fluoropolymer composition.

14. The coated metallic fastener insert of claim 10 wherein said coils of said insert provide 60° C. internal screw threads upon insertion within said tapped hole.

* * * * *